US012736724B2

(12) United States Patent
Hung et al.

(10) Patent No.: US 12,736,724 B2
(45) Date of Patent: Sep. 15, 2026

(54) DIFFRACTION OPTICAL COMPONENT, WEARABLE DISPLAYING DEVICE, AND FABRICATION METHOD THEREOF

(71) Applicants: ASUSTEK COMPUTER INC., Taipei (TW); National Taipei University of Technology, Taipei (TW)

(72) Inventors: Wen-Chang Hung, Taipei (TW); Ting-Wei Huang, Taipei (TW); Bo-Kai Zhang, Taipei (TW); Ji-Ping Sheng, Taipei (TW); Yu-Chieh Cheng, Taipei (TW); Nien-Jung Chiang, Taipei (TW)

(73) Assignees: ASUSTEK COMPUTER INC., Taipei (TW); NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 274 days.

(21) Appl. No.: 18/627,044

(22) Filed: Apr. 4, 2024

(65) Prior Publication Data

US 2025/0208326 A1 Jun. 26, 2025

(30) Foreign Application Priority Data

Dec. 21, 2023 (TW) ................................ 112150116

(51) Int. Cl.
*G02B 5/18* (2006.01)
*G02B 27/01* (2006.01)
*G02B 27/09* (2006.01)

(52) U.S. Cl.
CPC ........... *G02B 5/188* (2013.01); *G02B 5/1847* (2013.01); *G02B 27/0172* (2013.01); *G02B 27/0944* (2013.01)

(58) Field of Classification Search
CPC .. G02B 5/188; G02B 5/1847; G02B 27/0172; G02B 27/0944; G02B 1/08; G02B 5/18; G02B 5/1809; G02B 5/1814; G02B 5/1819; G02B 5/1833; G02B 5/1842; G02B 5/1861; G02B 5/30; G02B 5/3016; G02B 6/0011; G02B 6/0013; G02B 6/0015; G02B 6/0016; G02B 6/0033; G02B 6/0035; G02B 27/01; G02B 27/0101; G02B 27/017;

(Continued)

(56) References Cited

FOREIGN PATENT DOCUMENTS

| | | |
|---|---|---|
| CN | 101657741 B | 1/2012 |
| CN | 107003528 A | 8/2017 |
| CN | 111708112 A | 9/2020 |

(Continued)

*Primary Examiner* — Arnel C Lavarias
(74) *Attorney, Agent, or Firm* — MUNCY, GEISSLER, OLDS & LOWE, P.C.

(57) ABSTRACT

A diffraction optical component for a wearable displaying device is provided. The wearable displaying device includes a micro display for generating imaging light. The diffraction optical component includes a light guide plate, a first polarization volume grating (PVG) layer, a second PVG layer, and a third PVG layer. The light guide plate includes a first area, a second area, and a third area arranged on a surface thereof in sequence. The first PVG layer is formed on the first area. The second PVG layer is formed on the second area. The third PVG layer is formed on the third area. A thickness of the first PVG layer is greater than that of the second PVG layer, and is also greater than that of the third PVG layer.

12 Claims, 8 Drawing Sheets

(58) Field of Classification Search
CPC ............... G02B 27/42; G02B 27/4205; G02B 27/4261; G02B 27/4272
USPC .... 359/565, 483.01, 485.01, 485.05, 489.01, 359/489.6, 489.08, 489.11, 489.15, 359/489.16, 489.17, 487.01, 487.02, 359/487.03, 487, 6, 558, 566, 569, 572; 362/19, 600, 615, 617, 618, 619, 621, 362/622; 353/20; 349/201, 202
See application file for complete search history.

(56) References Cited

FOREIGN PATENT DOCUMENTS

| | | | | | |
|---|---|---|---|---|---|
| CN | 113589528 | A | * | 11/2021 | ........... G02B 5/3016 |
| CN | 114089531 | A | | 2/2022 | |
| CN | 114415288 | A | | 4/2022 | |
| CN | 115016126 | A | * | 9/2022 | ......... G02B 27/0103 |
| CN | 115509006 | A | | 12/2022 | |
| CN | 113168016 | B | | 6/2023 | |

* cited by examiner

DIFFRACTION OPTICAL COMPONENT, WEARABLE DISPLAYING DEVICE, AND FABRICATION METHOD THEREOF

CROSS-REFERENCE TO RELATED APPLICATION

This application claims the priority benefit of Taiwan Application Serial No. 112150116, filed on Dec. 21, 2023. The entirety of the above-mentioned patent application is hereby incorporated by reference herein and made a part of the specification.

BACKGROUND OF THE INVENTION

Field of the Invention

The disclosure relates to a displaying device, and in particular, to a diffraction optical component, a wearable displaying device having the diffraction optical component, and a fabrication method of the diffraction optical component.

Description of the Related Art

When conventional waveguide augmented reality (AR) glasses are used, bright areas appear on lenses of the glasses to block eyes or a face of a user, causing an eye glow problem. This adversely affects the application and use.

The bright light area mainly falls on an area where diffraction optical elements (DOE) are installed on the lenses of the glasses. Diffraction optical components mostly use gratings. A process of projecting incident light onto the gratings disperses energy to each diffraction order. Part of the light does not enter a waveguide as expected and is projected outward to the outside of the glasses, forming a bright light area.

BRIEF SUMMARY OF THE INVENTION

The disclosure provides a diffraction optical component for a wearable displaying device. The wearable displaying device includes a micro display for generating imaging light. The diffraction optical component includes a light guide plate, a first polarization volume grating (PVG) layer, a second PVG layer, and a third PVG layer. The light guide plate includes a first area, a second area, and a third area arranged on a surface thereof in sequence. The first PVG layer is formed on the first area. The second PVG layer is formed on the second area. The third PVG layer is formed on the third area. The imaging light enters the light guide plate through the first PVG layer, is diffracted by the second PVG layer, and then projected outward through the third PVG layer. A thickness of the first PVG layer is greater than that of the second PVG layer, and is also greater than that of the third PVG layer.

The disclosure further provides a wearable displaying device. The wearable displaying device includes a micro display and a diffraction optical component. The micro display is configured to generate imaging light. The diffraction optical component includes a light guide plate, a first PVG layer, a second PVG layer, and a third PVG layer. The light guide plate includes a first area, a second area, and a third area arranged on a surface thereof in sequence. The first PVG layer is formed on the first area. The second PVG layer is formed on the second area. The third PVG layer is formed on the third area. The imaging light enters the light guide plate through the first PVG layer, is diffracted by the second PVG layer, and then projected outward through the third PVG layer. A thickness of the first PVG layer is greater than that of the second PVG layer, and is also greater than that of the third PVG layer.

The disclosure further provides a fabrication method of a diffraction optical component, including: providing a light guide plate, and defining a first area, a second area, and a third area arranged on a surface thereof in sequence; forming a first PVG layer on the first area; forming a second PVG layer on the second area; and forming a third PVG layer on the third area. A thickness of the first PVG layer is greater than that of the second PVG layer, and is also greater than that of the third PVG layer.

The diffraction optical component in the disclosure uses the second PVG layer and the third PVG layer to amplify the imaging light from the micro display and project the imaging light outward. The first PVG layer, the second PVG layer, and the third PVG layer in the disclosure concentrate diffraction efficiency on first-order diffraction, that is, a Bragg regime. Therefore, it effectively avoids energy dispersion to various diffraction orders, to suppress or reduce eye glow problems. Secondly, the first PVG layer, the second PVG layer, and the third PVG layer in the disclosure are designed with different thicknesses. This helps to balance requirements of image quality and display efficiency.

DETAILED DESCRIPTION OF THE EMBODIMENTS

The specific embodiments of the disclosure are described in more detail below with reference to the schematic diagrams. The advantages and features of the disclosure become clearer from the following description and patent application scope. It should be noted that the diagrams are in a very simplified form and use imprecise proportions, and are only used to conveniently and clearly assist in explaining the purpose of the embodiments of the disclosure.

Figure 1:
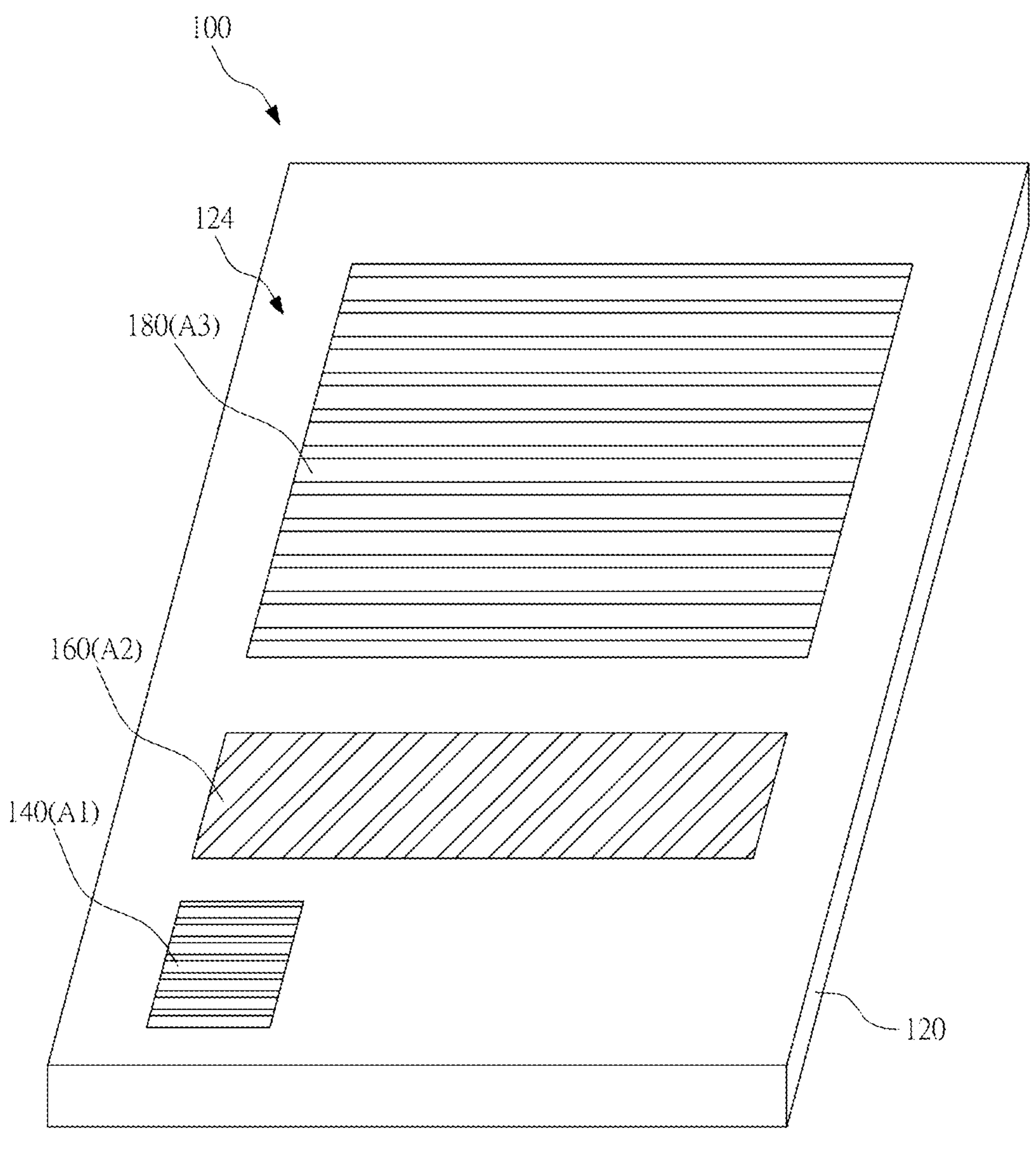
FIG. 1 is a schematic three-dimensional diagram of a diffraction optical component according to an embodiment of the disclosure.
Figure 2:
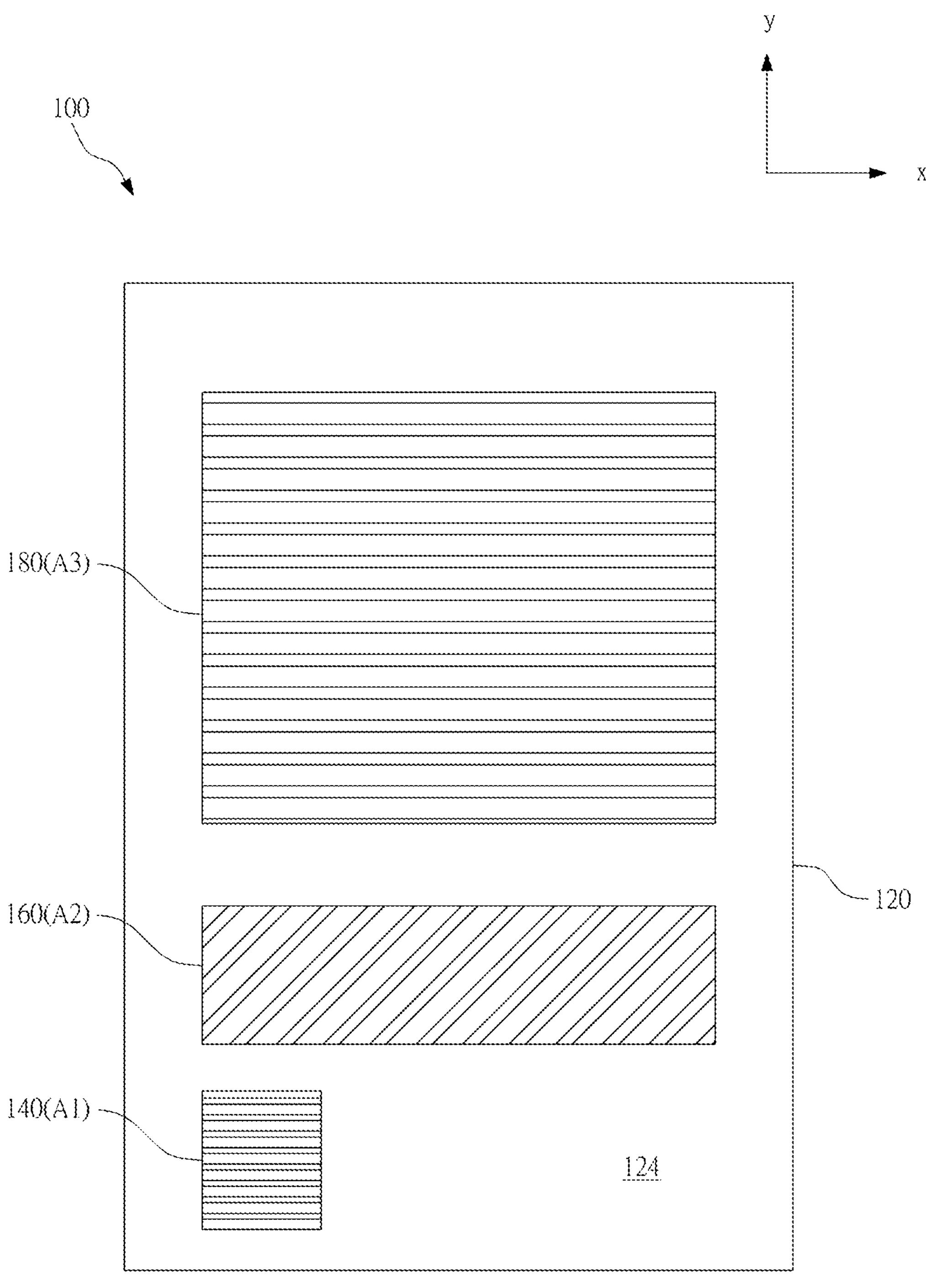
FIG. 2 is a schematic top view of the diffraction optical component in FIG. 1.
Figure 3:
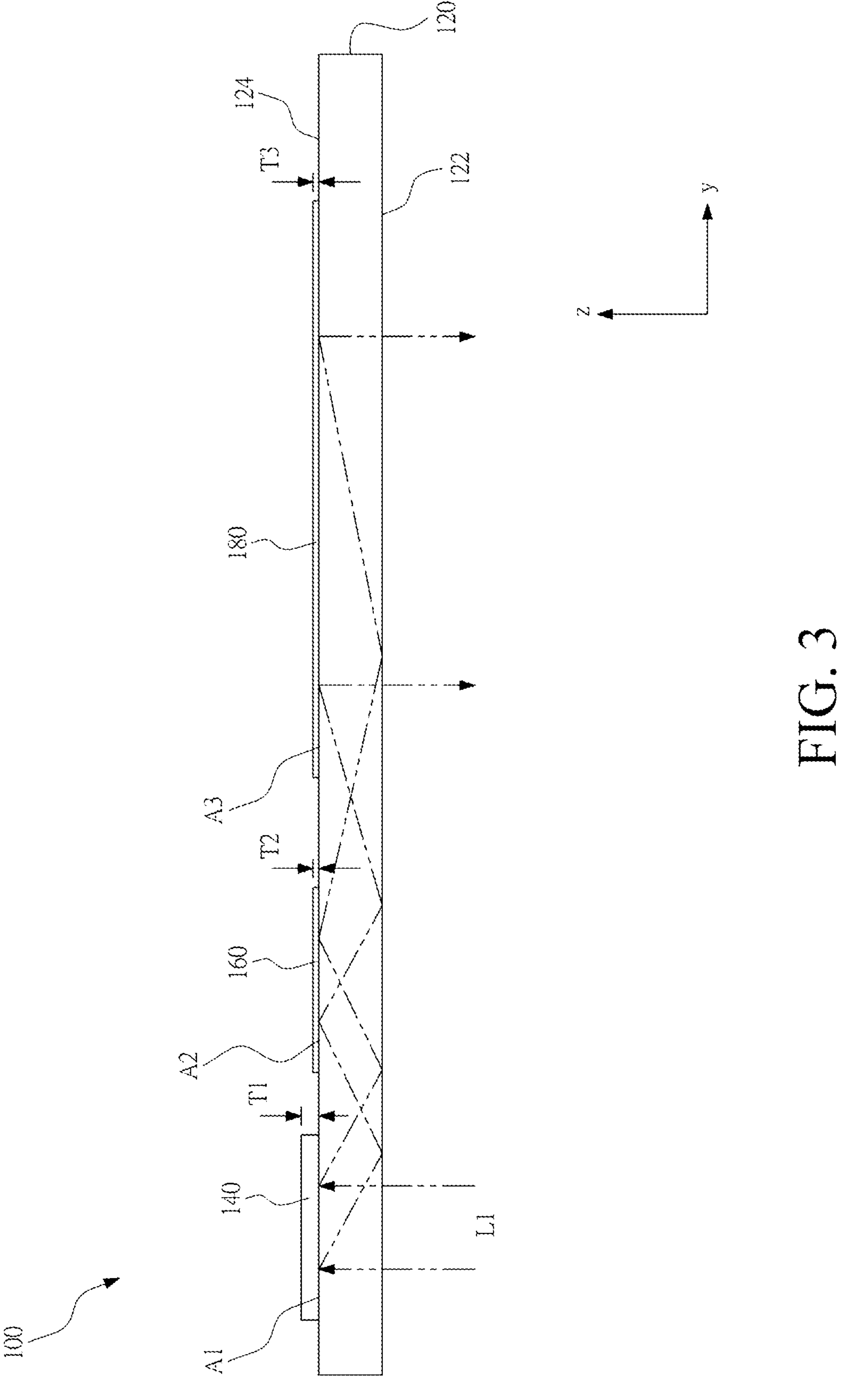
FIG. 3 is a schematic side view of the diffraction optical component in FIG. 1.

FIG. 1 is a schematic three-dimensional diagram of a diffraction optical component 100 according to an embodiment of the disclosure. FIG. 2 is a schematic top view of the diffraction optical component 100 in FIG. 1. FIG. 3 is a schematic side view of the diffraction optical component 100 in FIG. 1. The diffraction optical component 100 is suitable for a wearable displaying device, such as a pair of augmented reality glasses.

As shown in the figure, the diffraction optical component 100 includes a light guide plate 120, a first polarization volume grating (PVG) layer 140, a second PVG layer 160, and a third PVG layer 180.

The light guide plate 120 includes a first surface 122 and a second surface 124 opposite to each other. The first surface 122 is a surface of the light guide plate 120 facing an imaging light source, and the second surface 124 is a surface of the light guide plate 120 facing away from the imaging light source. The light guide plate 120 is a light-transmitting element that transmits light in a total reflection manner. The light guide plate 120 is a horizontal plate-shaped structure.

The second surface 124 includes a first area A1, a second area A2, and a third area A3 arranged in sequence. The first PVG layer 140 is formed on the first area A1. The second PVG layer 160 is formed on the second area A2. The third PVG layer 180 is formed on the third area A3.

In an embodiment, the first area A1, the second area A2, and the third area A3 are arranged in sequence along a Y-axis direction (namely, a first direction) in the figure. However, the disclosure is not limited thereto. In another embodiment, the first area A1, the second area A2, and the third area A3 are arranged in sequence along an X-axis direction (namely, a second direction) in the figure, or arranged in sequence along two different axis directions. In an embodiment, the first area A1 and the second area A2 are arranged along the Y-axis direction (namely, the first direction), and the second area A2 and the third area A3 are arranged along the X-axis direction (namely, the second direction). In an embodiment, the first direction is perpendicular to the second direction, corresponding to a pupil expansion direction. However, the disclosure is not limited thereto. In another embodiment, there is an angle between the first direction and the second direction, and the angle is between 60 and 150 degrees.

In an embodiment, the first PVG layer 140, the second PVG layer 160, and the third PVG layer 180 are all cholesteric liquid crystal polarization volume grating (CLCPVG) layers.

The first surface 122 is configured to receive imaging light L1. The imaging light L1 is projected to the first area A1 of the second surface 124 through the first surface 122. The first PVG layer 140 disposed on the first area A1 couples the imaging light L1 into the light guide plate 120. The first area A1 is understood as a light coupling area. The imaging light L1 is transmitted in the light guide plate 120 in the total reflection manner.

The imaging light L1 coupled into the light guide plate 120 through the first PVG layer 140 is then projected to the second area A2 of the second surface 124. The second PVG layer 160 disposed on the second area A2 performs X-direction pupil expansion on the imaging light L1 from the first area A1 and turns the imaging light L1. An area of the first area A1 is smaller than an area of the second area A2.

The imaging light L1 after the pupil expansion by the second PVG layer 160 is projected to the third area A3 of the second surface 124. The third PVG layer 180 disposed on the third area A3 performs Y-direction pupil expansion on the imaging light L1 from the second area A2 and couples the imaging light L1 out toward the first surface 122. The third area A3 is understood as an optical coupling-out area. In an embodiment, the area of the second area A2 is smaller than an area of the third area A3. However, the disclosure is not limited thereto. Based on an actual design, in an embodiment, the area of the second area A2 is greater than or equal to the area of the third area A3.

In this embodiment, the first PVG layer 140, the second PVG layer 160, and the third PVG layer 180 are all formed on the second surface 124 (that is, the inner surface) of the light guide plate 120. However, the disclosure is not limited thereto. Basically, as long as the first PVG layer 140, the second PVG layer 160, and the third PVG layer 180 are configured on the light guide plate 120 in an order in which the imaging light is transmitted in the light guide plate 120. This is applicable to the disclosure. In an embodiment, the first PVG layer 140, the second PVG layer 160, and the third PVG layer 180 are formed on the first surface 122 of the light guide plate 120 in sequence. Alternatively, the first PVG layer 140, the second PVG layer 160, and the third PVG layer 180 are partially formed on the first surface 122 of the light guide plate 120 and partially formed on the second surface 124 of the light guide plate 120.

Secondly, needs and functions of the first PVG layer 140, the second PVG layer 160, and the third PVG layer 180 are different. To effectively improve coupling-out image quality of the diffraction optical component in the disclosure, in this embodiment, different diffraction efficiencies are set for the first PVG layer 140, the second PVG layer 160, and the third PVG layer 180, as detailed below.

First, the first PVG layer 140 disposed on the first area A1 needs to guide all the imaging light L1 from the imaging light source (not shown) into the light guide plate 120, and requires a maximum diffraction efficiency. Compared with the first PVG layer 140, the second PVG layer 160 disposed on the second area A2 and the third PVG layer 180 disposed on the third area A3 are configured for two-dimensional pupil expansion. The uniformity of image pupil expansion splitting needs to be considered. Therefore, the diffraction efficiency is not too high.

Figure 4:
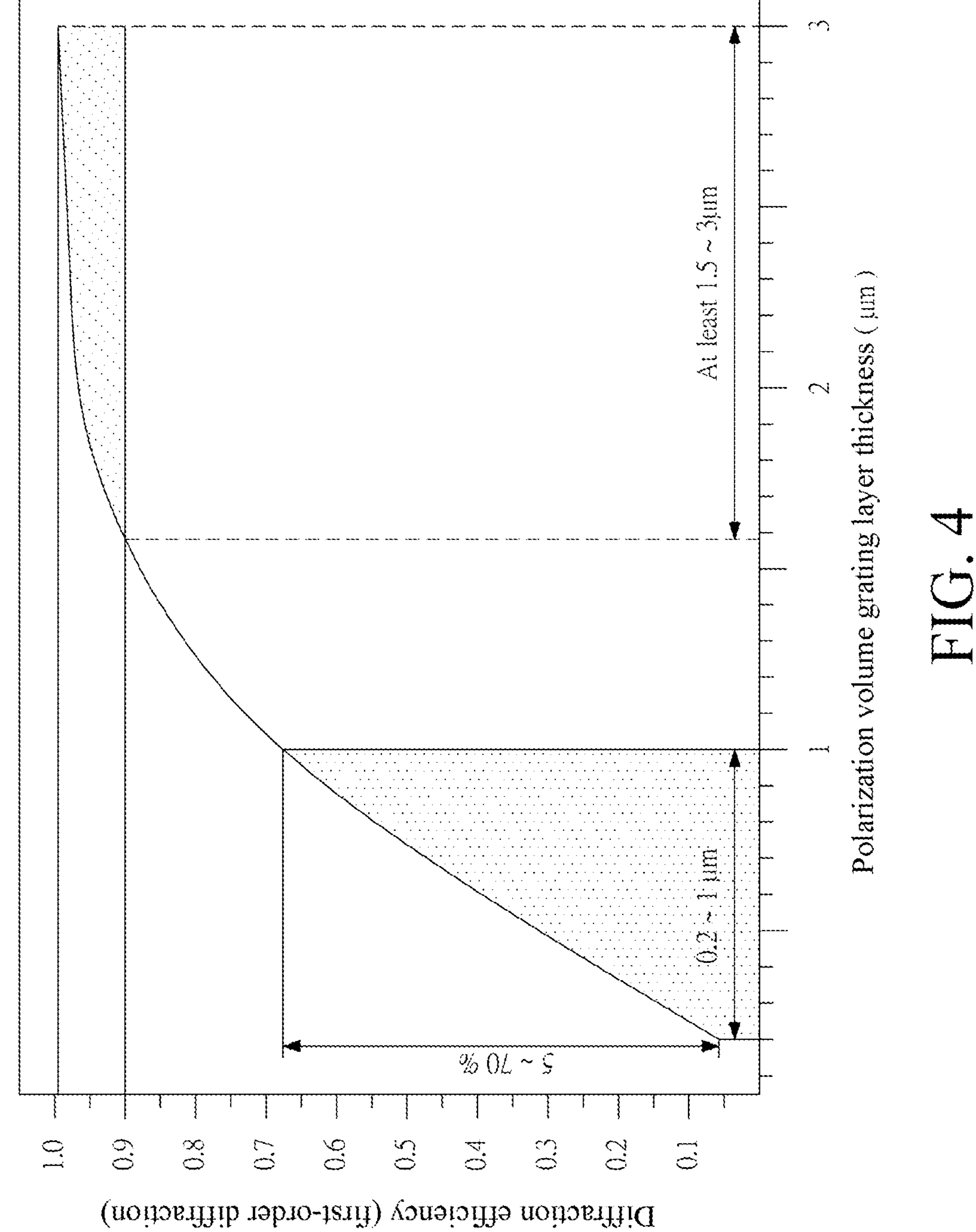
FIG. 4 is a diagram of a relationship between a polarization volume grating (PVG) layer thickness and an efficiency.

Refer to FIG. 4. FIG. 4 is a diagram of a relationship between a PVG layer thickness and a diffraction efficiency (first-order diffraction). It is found from the figure that when the thickness of the PVG layer is less than 1.5 μm, the thickness and the diffraction efficiency of the PVG layer are roughly linearly related. When the thickness of the PVG layer is between 1.5 μm and 3.0 μm, the diffraction efficiency of the PVG layer is close to 90% or exceed 90%.

In an embodiment, a thickness T1 of the first PVG layer 140 is controlled between 1.5 μm and 3 μm, including 1.5 μm and 3 μm. In this case, the diffraction efficiency of the first-order diffraction of the first PVG layer 140 is maintained close to 90% or above. A thickness T2 of the second PVG layer 160 and a thickness T3 of the third PVG layer 180 are controlled between 0.2 μm and 1 μm, including 0.2 μm and 1 μm. The diffraction efficiency of the first-order diffraction is controlled between 5% and 70% to facilitate adjustment of splitting efficiency. The specific thicknesses of the second PVG layer 160 and the third PVG layer 180 are adjusted according to the actual design. In an embodiment, a ratio of the thickness T1 of the first PVG layer 140 to the thickness T2 of the second PVG layer 160 is between 3:1 and 4:1. A ratio of the thickness T2 of the second PVG layer 160 to the thickness T3 of the third PVG layer 180 is between 1:1 and 3:1.

Figure 5:
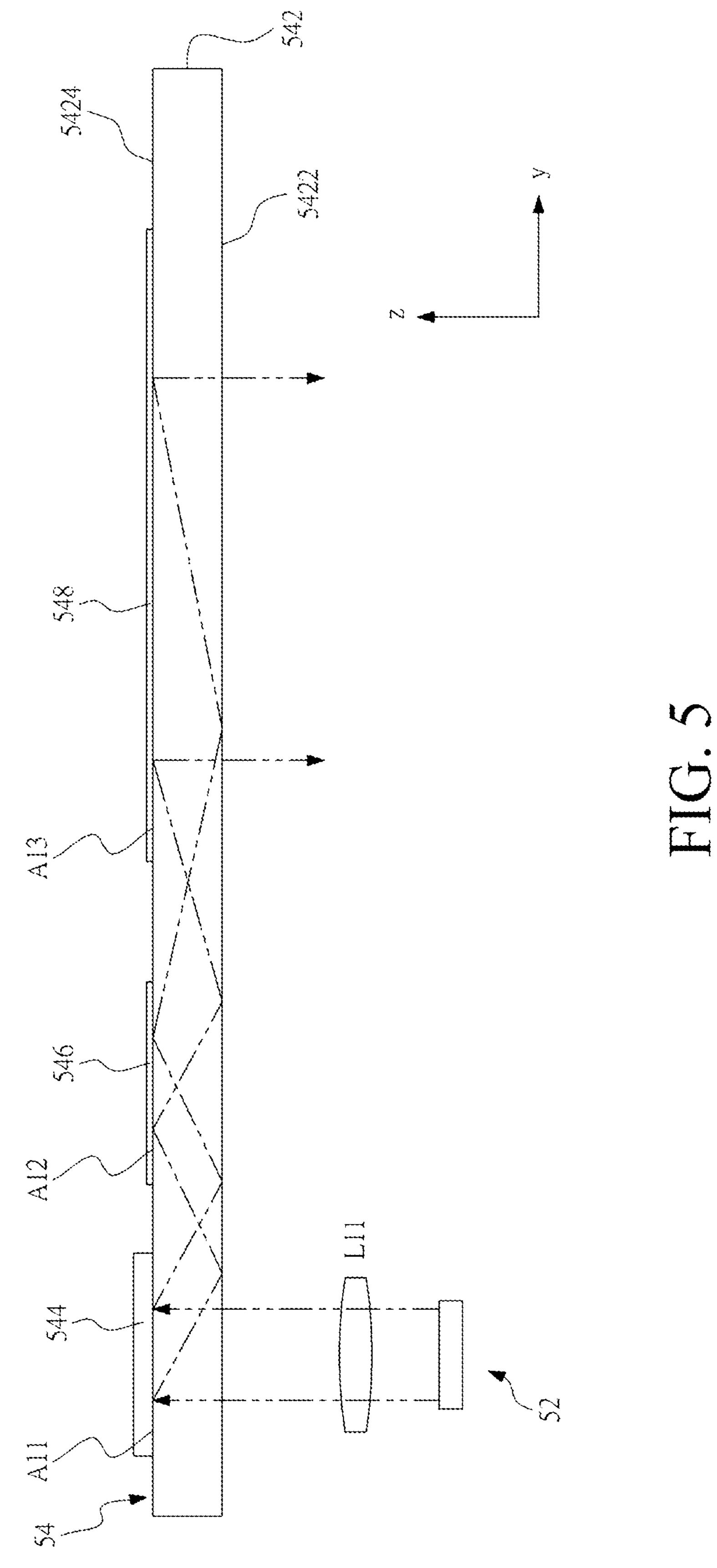
FIG. 5 is a schematic architectural diagram of a wearable displaying device according to an embodiment of the disclosure.

FIG. 5 is a schematic architectural diagram of a wearable displaying device 50 according to an embodiment of the disclosure.

As shown in the figure, the wearable displaying device 50 includes a micro display 52 and a diffraction optical component 54.

The micro display 52 is configured to generate imaging light L11. The micro display 52 is a liquid crystal display or a light emitting diode display. However, the disclosure is not limited thereto.

The diffraction optical component 54 includes a light guide plate 542, a first PVG layer 544, a second PVG layer 546, and a third PVG layer 548. The light guide plate 542 includes a first surface 5422 and a second surface 5424 opposite to each other. The first surface 5422 faces the micro display 52. The second surface 5424 includes a first area A11, a second area A12, and a third area A13 arranged in sequence. The first PVG layer 544 is formed on the first area A11. The second PVG layer 546 is formed on the second area A12. The third PVG layer 548 is formed on the third area A13.

The structural details of the diffraction optical component 54 are the same as those in the embodiment in FIG. 1 of the disclosure. Details are not described herein.

Figure 6:
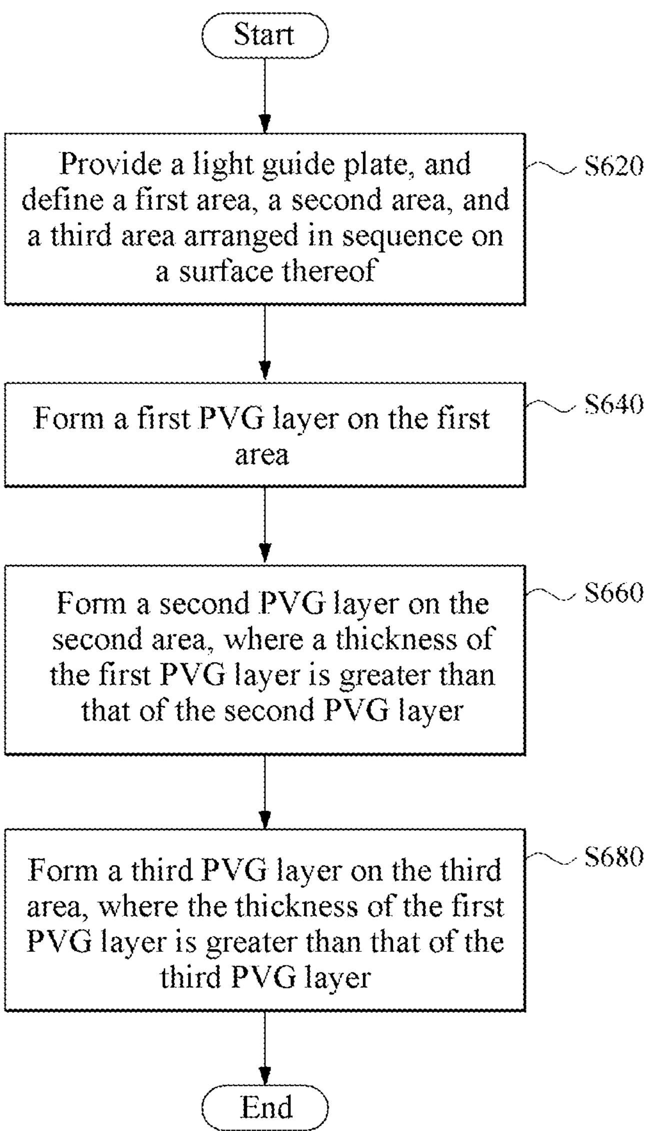
FIG. 6 is a flowchart of a fabrication method of a diffraction optical component according to an embodiment of the disclosure.

FIG. 6 is a flowchart of a fabrication method of a diffraction optical component according to an embodiment of the disclosure. This fabrication method is suitable for fabricating the diffraction optical component 100 shown in FIG. 1.

First, as described in step S620, a light guide plate 120 is provided, and a first area A1, a second area A2, and a third area A3 arranged in sequence are defined on a surface thereof.

In an embodiment, refer to FIG. 1 to FIG. 3 together. The light guide plate 120 includes a first surface 122 and a second surface 124 opposite to each other. The first area A1, the second area A2, and the third area A3 are arranged on the second surface 124.

As shown in step S640, a first PVG layer 140 is then formed on the first area A1.

Next, as described in step S660, a second PVG layer 160 is formed on the second area A2. A thickness T1 of the first PVG layer 140 is greater than a thickness T2 of the second PVG layer 160.

As described in step S680, a third PVG layer 180 is formed on the third area A3. The thickness T1 of the first PVG layer 140 is greater than a thickness T3 of the third PVG layer 180.

The first PVG layer 140, the second PVG layer 160, and the third PVG layer 180 are formed on the first area A1, the second area A2, and the third area A3 respectively through different process steps. In an embodiment, the first PVG layer 140, the second PVG layer 160, and the third PVG layer 180 are formed on a film, and then disposed on the light guide plate 120 through transfer printing. For details, refer to embodiments shown in FIG. 8. In an embodiment, the first PVG layer 140, the second PVG layer 160, and the third PVG layer 180 are directly formed on the light guide plate 120.

Figure 7:
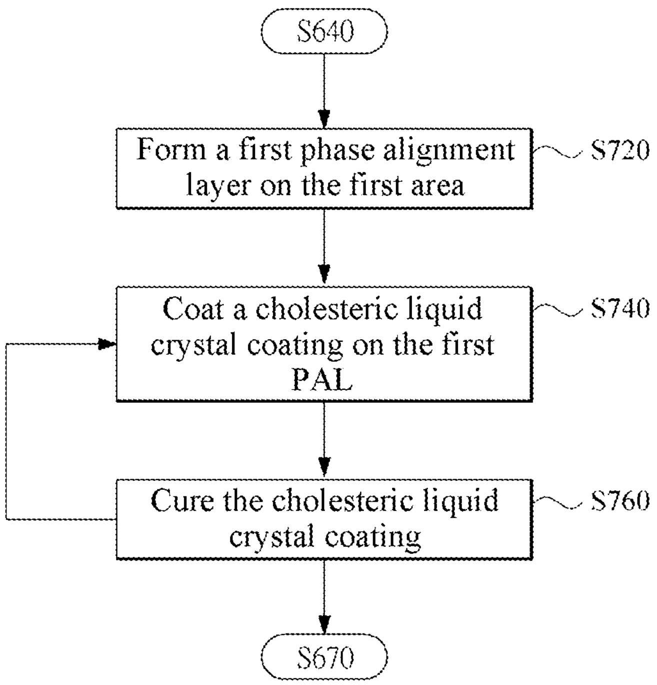
FIG. 7 is a flowchart of an embodiment of step S640 of FIG. 6.

FIG. 7 is a flowchart of an embodiment of step S640 in FIG. 6.

First, as described in step S720, a first phase alignment layer (PAL) is formed on the first area A1.

As described in step S740, a cholesteric liquid crystal coating is then coated on the first PAL.

Next, as described in step S760, the cholesteric liquid crystal coating is cured. In an embodiment, ultraviolet light is used to cure the cholesteric liquid crystal coating.

According to actual needs, the steps S740 and S760 are repeated until a thickness of the cholesteric liquid crystal coating reaches a preset thickness. For the first PVG layer 140, the preset thickness is between 1.5 μm and 3 μm.

This embodiment is described by using step S640, that is, forming the first PVG layer 140 on the first area A1, as an example. However, the disclosure is not limited thereto. This process step is also applicable to steps S660 and S680 in FIG. 6 to fabricate the second PVG layer 160 and the third PVG layer 180 in the disclosure. For the second PVG layer 160 and the third PVG layer 180, the preset thickness is between 0.2 μm and 1 μm.

Figure 8:
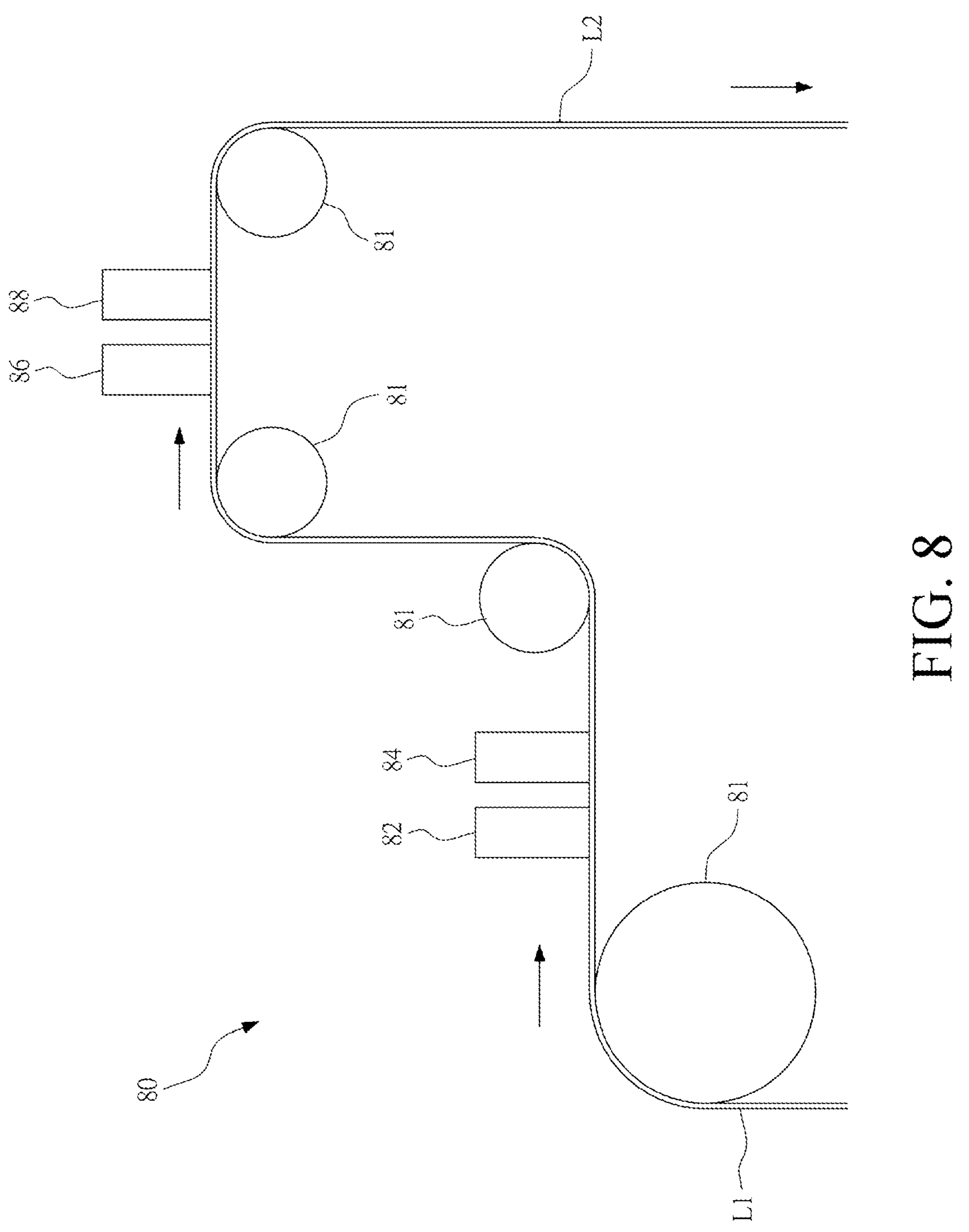
FIG. 8 shows an embodiment of a PVG layer manufacturing device.

FIG. 8 shows an embodiment of a PVG layer manufacturing device. The PVG layer manufacturing device 80 is a roll-to-roll system device, and is suitable for mass production of PVG layers on a film F1. The PVG layer manufacturing device 80 is suitable for manufacturing the diffraction optical component 100 shown in FIG. 1. After a PVG film layer F2 produced by the PVG layer manufacturing device 80 is cut into appropriate sizes, it can be attached to the light guide plate 120 through transfer printing to complete the diffraction optical component 100 shown in FIG. 1.

As shown in the figure, the PVG layer manufacturing device 80 includes a plurality of rollers 81. The rollers are suitable for guiding the film F1 to an alignment material coating unit 82, an alignment processing unit 84, a liquid crystal coating unit 86, and a light curing unit 88 in sequence. The alignment material coating unit 82 is suitable for coating an alignment material on the film F1. The alignment processing unit 84 performs pattern exposure on the alignment material through a polarizing mask (not shown) to form an alignment layer on the film F1. The liquid crystal coating unit 86 is suitable for coating the liquid crystal coating on the alignment layer. The light curing unit 88 is suitable for generating ultraviolet light to cure the liquid crystal coating to complete the PVG film layer F2.

In addition to the alignment material coating, alignment processing, liquid crystal coating, and light curing technologies above, the PVG layer manufacturing device 80 is also used with other technologies suitable for controlling film thickness, such as spray coating, blade coating, slot die coating, wire-bar coating, dip coating, screen printing, flexographic printing), gravure printing, and inkjet printing, to control the thickness of the PVG layer formed on the film L1.

The diffraction optical component 100, 54 in the disclosure uses the second PVG layer 160, 546 and the third PVG layer 180, 548 to amplify the imaging light L1, L11 from the micro display 52 and project the imaging light outward. The first PVG layer 140, 544, the second PVG layer 160, 546, and the third PVG layer 180, 548 in the disclosure concentrate diffraction efficiency on first-order diffraction, that is, a Bragg regime. Therefore, it effectively avoids energy dispersion to various diffraction orders, to suppress or reduce eye glow problems. Secondly, the first PVG layer 140, 544, the second PVG layer 160, 546, and the third PVG layer 180, 548 in the disclosure are designed with different thicknesses T1, T2, and T3. This helps to balance requirements of image quality and display efficiency.

The above are only preferred embodiments of the disclosure and do not impose any restrictions on the disclosure. Any form of equivalent substitution or modification made by any person skilled in the art to the technical means and technical content provided in the disclosure without departing from the technical means of the disclosure shall not deviate from the technical means of the disclosure and still shall fall within the protection scope of the disclosure.

What is claimed is:

1. A diffraction optical component for a wearable displaying device, wherein the wearable displaying device comprises a micro display for generating imaging light, and the diffraction optical component comprises:

a light guide plate, comprising a first area, a second area, and a third area arranged on a surface thereof along a first direction in sequence;

a first polarization volume grating (PVG) layer, formed on the first area;

a second PVG layer, formed on the second area; and a third PVG layer, formed on the third area, wherein the imaging light enters the light guide plate through the first PVG layer, is diffracted by the second PVG layer, and then projected outward through the third PVG layer; and a thickness of the first PVG layer is greater than that of the second PVG layer, and is also greater than that of the third PVG layer.

2. The diffraction optical component according to claim 1, wherein a thickness ratio of the first PVG layer to the second PVG layer is between 3:1 and 4:1.

3. The diffraction optical component according to claim 2, wherein a thickness ratio of the second PVG layer to the third PVG layer is between 1:1 and 3:1.

4. The diffraction optical component according to claim 1, wherein the first PVG layer, the second PVG layer, and the third PVG layer are cholesteric liquid crystal polarization volume grating layers.

5. The diffraction optical component according to claim 1, wherein the light guide plate comprises a first surface and a second surface opposite to each other, the first surface faces the micro display, the first area, the second area, and the third area are arranged on the second surface, and the imaging light is projected to the first area through the first surface.

6. The diffraction optical component according to claim 1, wherein an area of the first area is smaller than an area of the second area, and the area of the second area is smaller than an area of the third area.

7. The diffraction optical component according to claim 1, wherein an area of the first area is smaller than an area of the second area, and the area of the second area is greater than or equal to an area of the third area.

8. A wearable displaying device, comprising:

a micro display for generating imaging light; and a diffraction optical component, comprising:

a light guide plate, comprising a first area, a second area, and a third area arranged on a surface thereof along a first direction in sequence;

a first polarization volume grating (PVG) layer, formed on the first area;

a second PVG layer, formed on the second area; and a third PVG layer, formed on the third area, wherein the imaging light enters the light guide plate through the first PVG layer, is diffracted by the second PVG layer, and then projected outward through the third PVG layer; and a thickness of the first PVG layer is greater than that of the second PVG layer, and is also greater than that of the third PVG layer.

9. The wearable displaying device according to claim 8, wherein the light guide plate comprises a first surface and a second surface opposite to each other, the first surface faces the micro display, the first area, the second area, and the third area are arranged on the second surface, and the imaging light is projected to the first area through the first surface.

10. The wearable displaying device according to claim 8, wherein the wearable displaying device is a pair of augmented reality glasses.

11. A fabrication method of a diffraction optical component, comprising:

providing a light guide plate, and defining a first area, a second area, and a third area arranged on a surface thereof along a first direction in sequence;

forming a first polarization volume grating (PVG) layer on the first area;

forming a second PVG layer on the second area; and forming a third PVG layer on the third area, wherein a thickness of the first PVG layer is greater than that of the second PVG layer, and is also greater than that of the third PVG layer.

12. The fabrication method according to claim 11, wherein the step of forming the first PVG layer on the first area comprises:

(a) forming a first phase alignment layer (PAL) on the first area;

(b) coating a cholesteric liquid crystal coating on the first PAL;

(c) curing the cholesteric liquid crystal coating; and (d) repeating the steps (b) and (c) until a thickness of the cholesteric liquid crystal coating reaches a preset thickness.

* * * * *